D. C. WALKER.
APPARATUS FOR PRECIPITATION.
APPLICATION FILED MAR. 14, 1916. RENEWED AUG. 24, 1918.
1,281,443.
Patented Oct. 15, 1918.
2 SHEETS—SHEET 1.
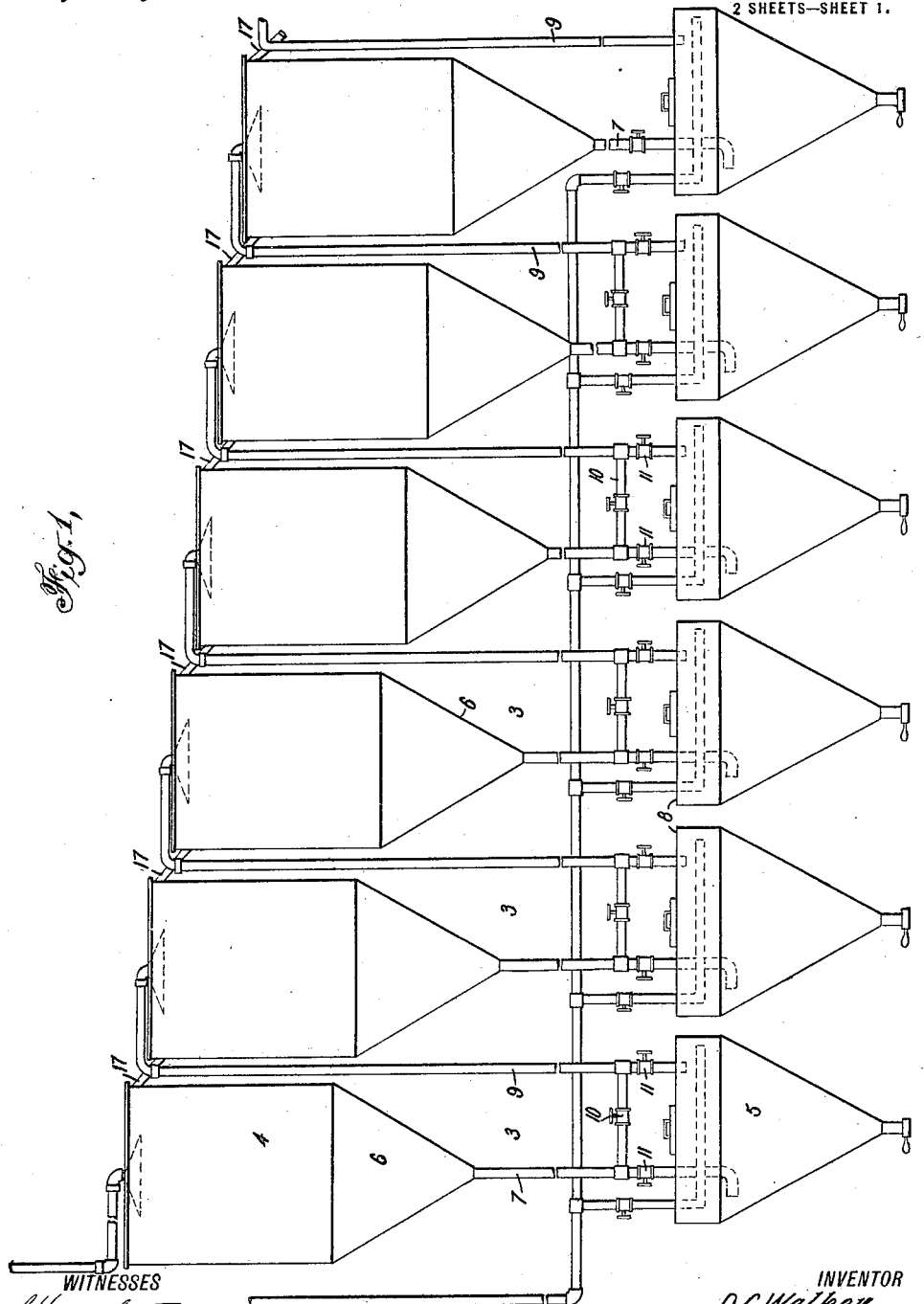

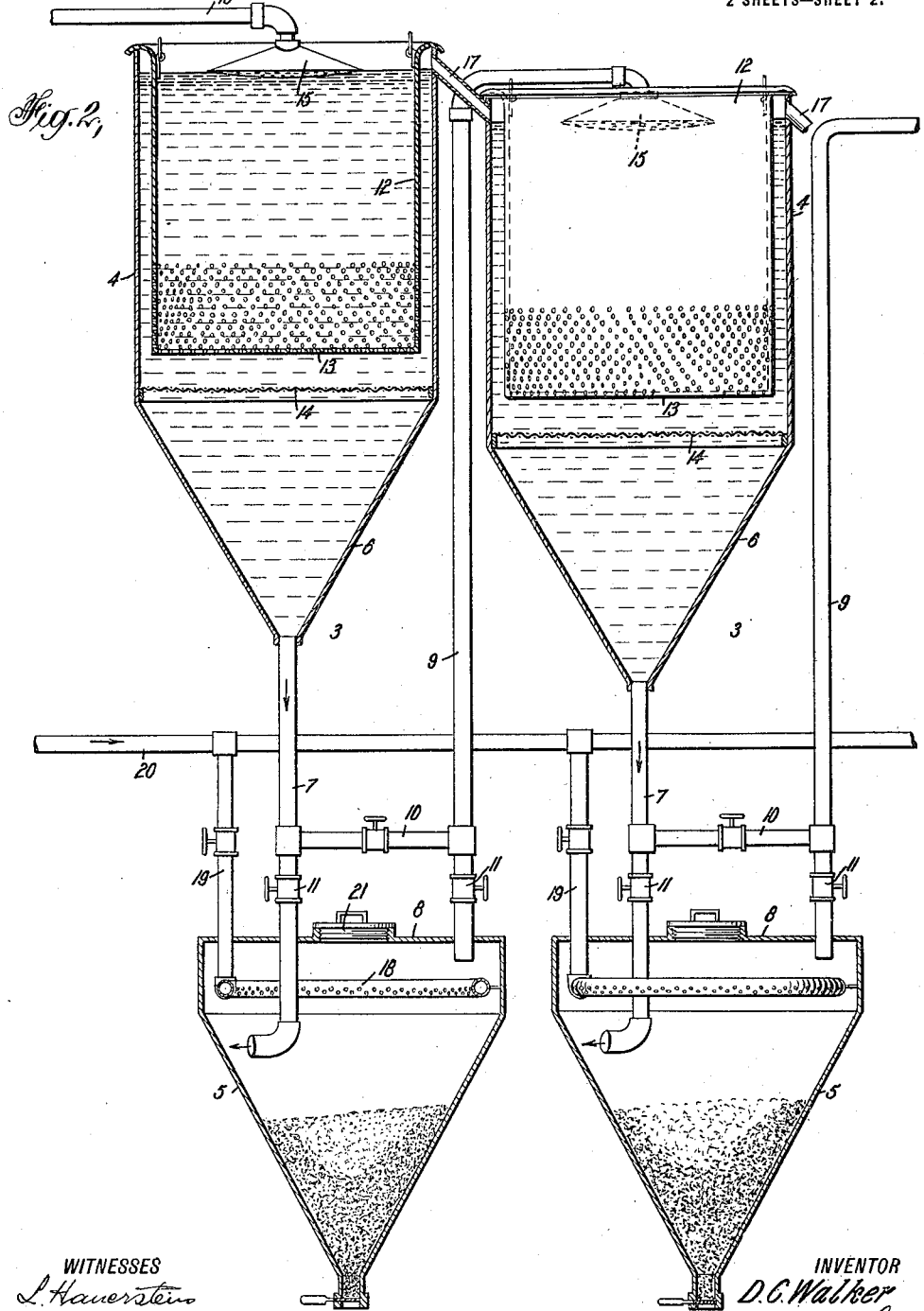

UNITED STATES PATENT OFFICE.

DAVID CREEL WALKER, OF ANACONDA, MONTANA.

APPARATUS FOR PRECIPITATION.

1,281,443. Specification of Letters Patent. Patented Oct. 15, 1918.

Application filed March 14, 1916, Serial No. 84,062. Renewed August 24, 1918. Serial No. 251,340.

*To all whom it may concern:*

Be it known that I, DAVID C. WALKER, a citizen of the United States, and a resident of Anaconda, in the county of Deerlodge and State of Montana, have invented a new and Improved Apparatus for Precipitation, of which the following is a full, clear, and exact description.

An object of the invention is to provide an apparatus for the continuous precipitation of solids from a solution flowing through the apparatus. Another object of the invention is to provide an apparatus of the class mentioned in which the precipitate may be removed without interrupting the process of precipitation. A further object of the invention is to provide a simple, inexpensive, and automatic apparatus for the precipitation of solids from liquids.

With the above and other objects in view, the nature of which will more fully appear as the description proceeds, the invention consists in the novel construction, combination and arrangement of parts, as herein fully described, illustrated and claimed. In the accompanying drawings, forming part of the application, similar characters of reference indicate corresponding parts in all the views.

Figure 1 is an elevation of a precipitating apparatus embodying my invention; and Fig. 2 is a section through a pair of adjacent units of the apparatus.

Referring to the drawings, the apparatus comprises a plurality of units 3—3, each unit comprising a precipitating tank 4 and a settling tank 5. The precipitating tank is preferably of cylindrical cross-section having a funnel-shaped bottom 6 from which a conduit 7 extends through the closed top 8 of the settling tank 5, the settling tank being preferably cone shape, the top being at the larger diameter of the cone. A conduit 9 rises from the top of each settling tank to discharge into the precipitating tank 4 of the adjacent unit 3, the settling tank of the last unit discharging simply into a waste conduit, not shown in the drawings. The conduits 7 and 9 of the same unit are united by a valve-controlled conduit 10 above the settling tank 5, and each conduit 7 and 9 has a valve 11 below the conduit 10.

A removable container 12 is suspended from the brim within each of the precipitating tanks 4 so that a clearance is formed between the walls of the container and the tank, the removable container being open at the top and having a perforated bottom 13. A portion of its wall, near the bottom, is also perforated. This container is adapted to carry the solid substance which is used for the precipitation of the solids from the solution. The said solid substance is preferably in the shape of shavings of a metal such as zinc when a cyanid solution of gold is to be treated. The size of the shavings is larger than the perforations of the containers. A sieve or screen 14 is provided at the top of the funnel-shaped bottom 6 of each container to prevent any shavings that may have dropped out of the container from passing into the settling tank.

The discharge end of each conduit 9 is provided with a sprinkler head 15 for delivering the solution coming through the conduit 9 into the container 12. The main solution supply 16 leading to the first unit is also provided with a sprinkler head 15 to discharge into the container of said unit.

The precipitating tanks of each unit have their level depressed from the level of the preceding tank, while all the settling tanks of all units are on the same level; consequently, the liquid level in each preceding precipitating tank is higher than in the succeeding one. It follows that the normal hydrostatic head in the succeeding settling tanks decreases. There is an overflow 17 between each pair of adjacent tanks; and the horizontal branch of the discharging end of the conduit 9 is slightly below the discharge aperture of the preceding tank 4, so there will be only an overflow from the preceding tank into the adjacent tank when there is a material resistance to flow through the conduit 9.

Normally the solution flowing through the container into the tank 4 is directed by the conduit 7 into the settling tank 5 of the said unit, the valve-controlled conduit 10 being closed. The liquid delivered to the settling tank 5 finds its escape through the conduit 9, the valve 11 being open, into the container 12 of the adjacent unit until it reaches the last unit, where the conduit 9 leads to a waste conduit. The precipitate formed in the solution as it passes through the material within the container 12 is carried into the settling tank 5, where it will have a tendency to accumulate in the cone portion thereof, the liquid part passing to the succeeding unit through the conduit 9.

When the settling tank 5 is to be discharged of the sediment accumulated therein, the valves 11 are closed and the valve 10 is opened, whereby the flow from the preceding to the succeeding unit is direct, without passing through the settling tank of the preceding unit. To facilitate the discharge of the sediment, each settling tank is provided with a perforated, tubular ring 18 connected by a valve-controlled conduit 19 to the main water supply 20. Each settling tank is provided with a hand opening closed by a plug 21 through which the settling tanks may be inspected or the discharge of sediment facilitated.

Any of the containers 12 can be removed to be cleaned without stopping the process of precipitation by swinging the sprinkling head 15 out of the container 12 and the horizontal rim of the conduit 9 to one side of the container 4. The discharge into the tank from the preceding unit will pass into the succeeding unit either through its settling tank or through the conduit 10 without forming any precipitate within the unit where the container is removed.

I claim:

1. In an apparatus for precipitation, a plurality of successive units, each comprising a precipitation tank and a settling tank at a lower level than the precipitation tank, the levels of the successive precipitation tanks being lower than that of the preceding tanks, an overflow from the preceding to the succeeding precipitation tanks, a perforated container in each precipitation tank for a substance to cause a precipitate from a solution flowing through the container, means for delivering a solution to the first precipitation tank, a valve-controlled conduit from the precipitation tank to the settling tank of the same unit to discharge the solution, with the precipitate formed, into the settling tank, a screen in each precipitation tank between the container and said conduit, a valve-controlled conduit from the settling tank to the container of the successive precipitation tank to convey the liquid part of the solution from the settling tank to the succeeding unit, a valve-controlled conduit connecting the discharge conduit of the precipitation tank with the conveying conduit of the settling tank whereby the precipitation tank of a preceding unit can discharge directly into the precipitation tank of the succeeding unit, and means for washing out the sediment from the settling tank.

2. In an apparatus for precipitation, a plurality of successive units, each comprising a precipitation tank and a settling tank at a lower level than the precipitation tank, the levels of the successive precipitation tanks being lower than the level of the preceding tank, a discharge conduit from the precipitating tank into the settling tank, a delivery conduit from the settling tank to the precipitating tank of the succeeding unit, said conduit being adapted to deliver liquid under the hydrostatic head of the unit, a conduit joining the first two conduits above the settling tank, valves associated with all of said conduits whereby the flow from the discharge conduit can be made direct through the delivery conduit without a flow through the settling tank, and means for washing out the sediment from the settling tank.

3. In an apparatus for precipitation, a plurality of successive units each unit comprising a precipitation tank, a removable, perforated container suspended within said tank, a cone-shaped settling tank below the precipitation tank, a conduit from the precipitation tank to the settling tank, a conduit rising from the settling tank to a point below the level of the liquid in the precipitation tank to discharge into the precipitation tank of a successive unit, a conduit joining the rise and the discharge conduits above the settling tank, and valves for all of said conduits for directing the flow from the discharge conduit through the rising conduit without a flow through the settling tank.

4. In an apparatus for precipitation, a plurality of successive units each unit comprising a precipitation tank having a funnel-shaped bottom, a removable, perforated container suspended from the brim of said tank, a cone-shaped settling tank having a closed top at the larger diameter thereof, a valve-controlled discharge conduit from the funnel-shaped bottom to the top of the settling tank, a screen separating said conduit from the container, a valve-controlled rising conduit from the precipitation tank to a point below the liquid level of the precipitation tank for discharging into a perforated container of a successive unit, an overflow from the precipitation tank to the precipitation tank of the successive unit, a valve-controlled conduit connecting the discharge and rising conduits above their valves, and means for supplying a spray to said settling tank.

5. In an apparatus for precipitation, a plurality of successive units each unit comprising a precipitation tank, a closed settling tank below the precipitation tank, a conduit connecting the bottom of the precipitation tank with the settling tank so that the said settling tank is subjected to the hydrostatic head of the precipitation tank, a discharge conduit from the top of the settling tank to a point below the level of the precipitation tank, wherethrough a liquid flow is caused by said hydrostatic head into the precipitation tank of a successive unit, and means associated with said conduits at a point above the settling tank for diverting the flow from the precipitation tank to the settling tank and into the discharge conduit.

6. In an apparatus for precipitation, a plurality of successive units each comprising a precipitation tank and a settling tank at a lower level than the precipitation tank, all of said settling tanks being at a substantially common level, the level of the succeeding precipitation tanks being lower than that of the preceding tanks, an overflow from the preceding to the succeeding precipitation tanks, each of said precipitation tanks having a funnel-shaped bottom, a perforated container suspended from the brim of each of said tanks above the funnel-shaped bottom, a screen separating the bottom from the container, each of said settling tanks being cone-shaped and having a closed top which is at the larger diameter of the cone, a valve-controlled conduit from each precipitation tank to the settling tank of same unit, a valve-controlled conduit rising from the top of the settling tank to the container of the succeeding precipitation tank, the hydrostatic head within said conduit being slightly less than that of the settling tank of the same unit, a valve-controlled conduit connecting the discharge and rising conduits at a point above their valves, whereby the flow of the settling tank may be diverted into the rising conduit of the same unit, and means for supplying a spray in each of said settling tanks.

In testimony whereof I have signed my name to this specification in the presence of two subscribing witnesses.

DAVID CREEL WALKER.

Witnesses:
IRA B. WALKER,
H. C. GUTELIUS.

Copies of this patent may be obtained for five cents each, by addressing the "Commissioner of Patents, Washington, D. C."